April 16, 1929.     W. A. GIBBS     1,709,719
ANIMAL TRAP
Original Filed May 11, 1923    3 Sheets-Sheet 1
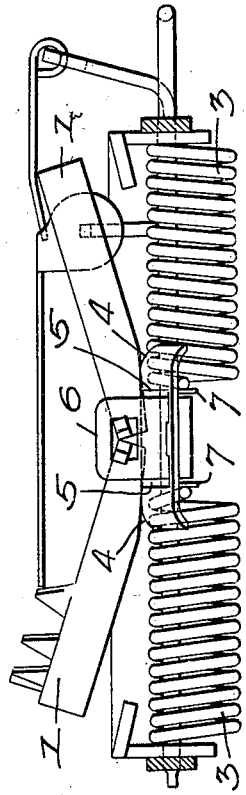
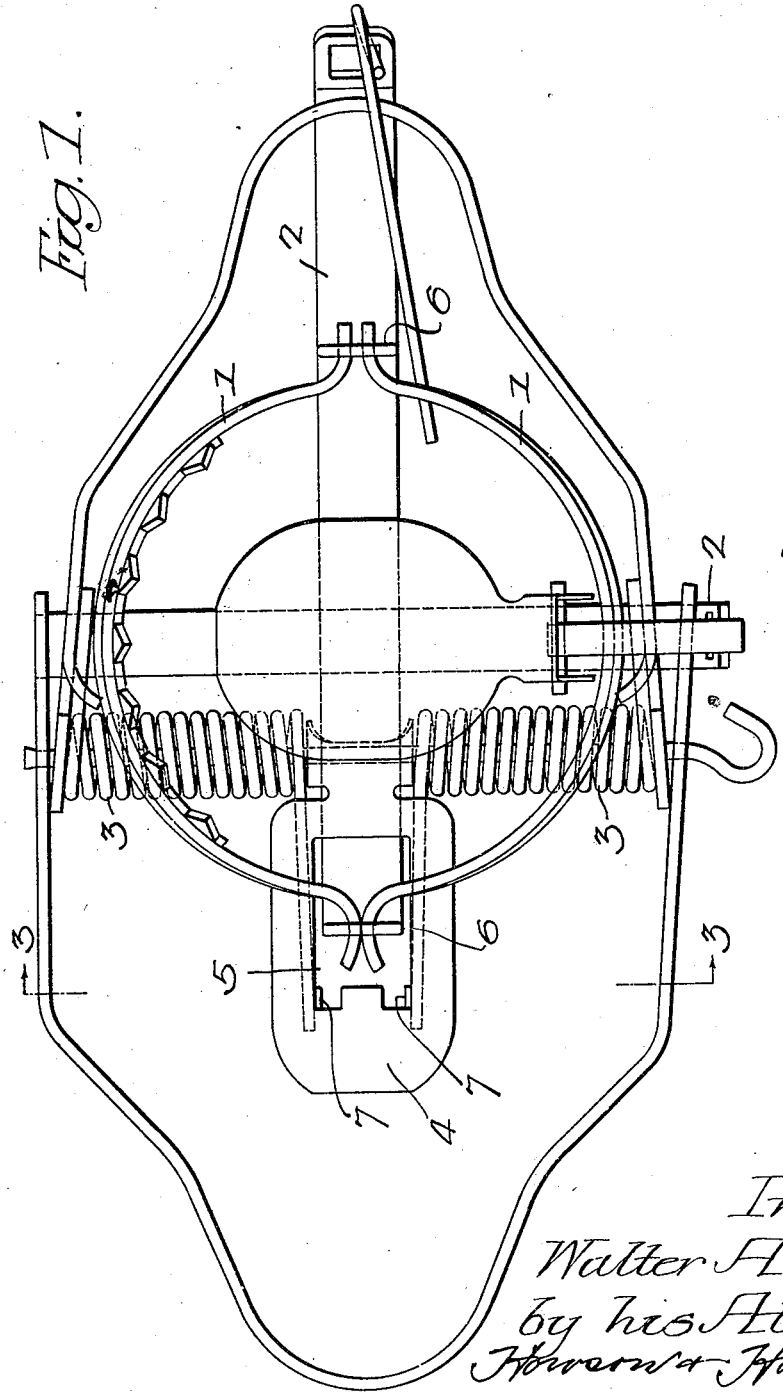
Inventor.
Walter A. Gibbs.
by his Attorneys.
Howson & Howson

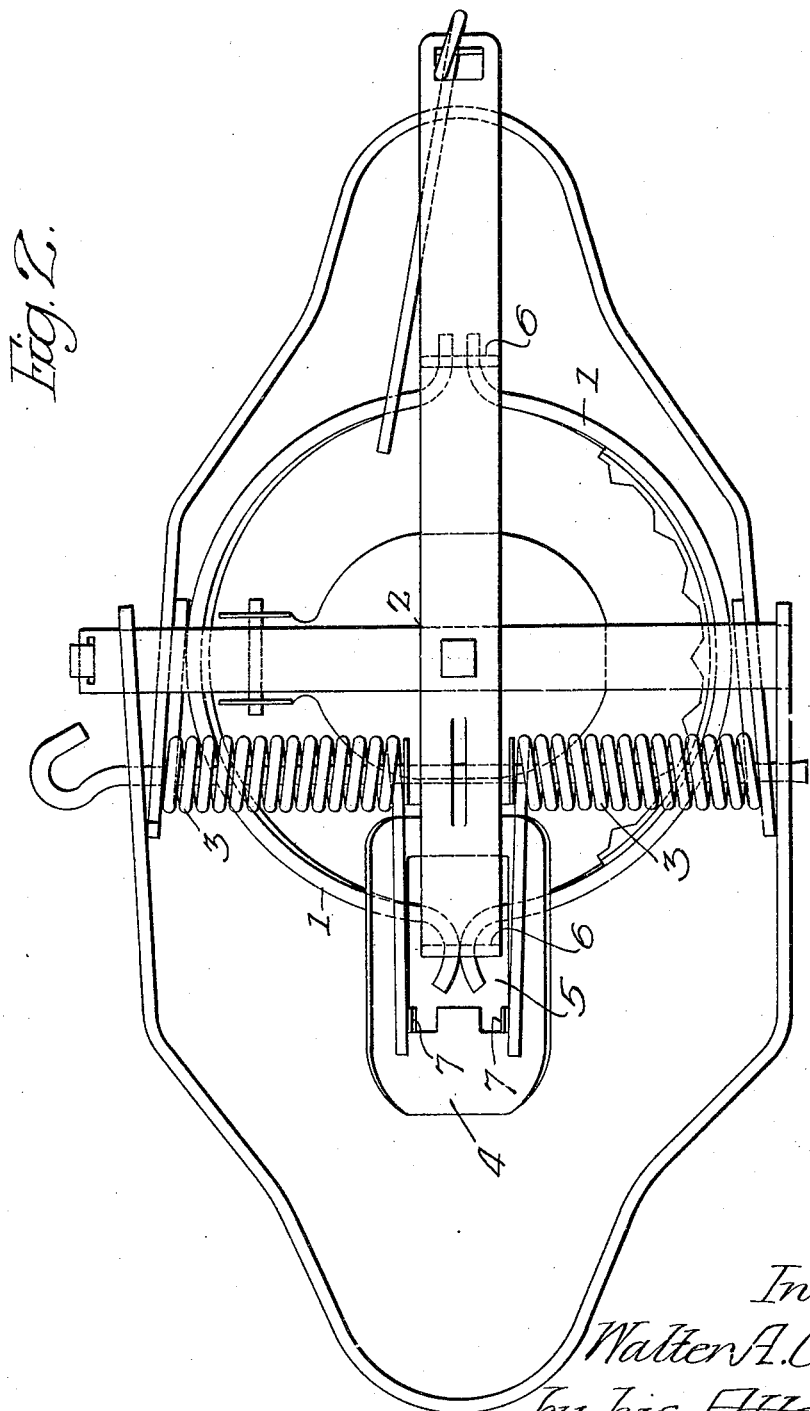

April 16, 1929.  W. A. GIBBS  1,709,719
ANIMAL TRAP
Original Filed May 11, 1923   3 Sheets-Sheet 3

Inventor
Walter A. Gibbs.
by his Attorneys

Patented Apr. 16, 1929.

1,709,719

UNITED STATES PATENT OFFICE.

WALTER A. GIBBS, OF HOLLY OAK, DELAWARE.

ANIMAL TRAP.

Original application filed May 11, 1923, Serial No. 638,212. Divided and this application filed April 28, 1924. Serial No. 709,593.

This invention relates to animal traps, and resides in the novel and advantageous features of construction hereinafter fully set forth and illustrated in the attached drawings, in which:

Figure 1 is a plan view of a trap illustrating my invention;

Fig. 2 is an inverted plan view of the trap;

Fig. 3 is a section on the line 3—3, Fig. 1;

Figure 4:
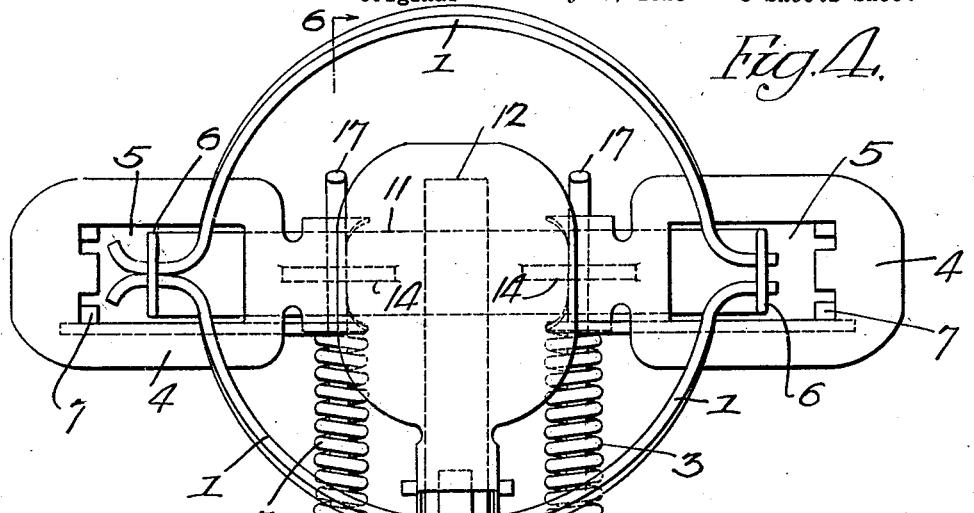
Fig. 4 is a plan view of another trap embodying a feature of the invention.

With reference to the drawings, the trap in each instance comprises a pair of cooperating jaws 1, 1, mounted upon a suitable frame or base 2 and actuated by mean of a spring or springs 3, 3, operating through the medium of a lever 4 adapted to force the jaws together. The lever 4 is commonly made, as illustrated, with an aperture 5, and when the trap is sprung embraces the arms in a well known manner.

It is customary in using apparatus of this type and with a closing lever of the type illustrated, to so arrange the actuating springs 3, 3, that one end of the spring, or of each of the springs when more than one is employed, bears against the said lever, the other end of the spring bearing against a suitable part of the frame, or, where the trap involves two sets of jaws, against the latter. With this construction, there is a tendency for the spring ends underlying the lever 4 to move inwardly under the aperture and to bear against the sides of the jaws 1, 1, or against the sides of the upstanding portion 6 of the frame 2, in which the jaws 1, 1, are journaled, this, by reason of the frictional bearing of the spring ends against the said parts, materially reducing the efficiency of the trap in operation.

In the present instance I provide means for retaining the spring ends entirely clear of the aperture 5 and underneath the solid portions of the lever 4, thereby preventing contact of the spring ends with the jaws or with the frame. Although various means may be employed for so holding the ends of the springs, I have found it of advantage to form lugs 7, 7, which project from the under side of the lever 4 and prevent movement of the spring ends beyond the side edges of the aperture 5, these lugs being formed in the present instance by stamping out and bending down portions of the lever, as clearly illustrated.

Figure 5:
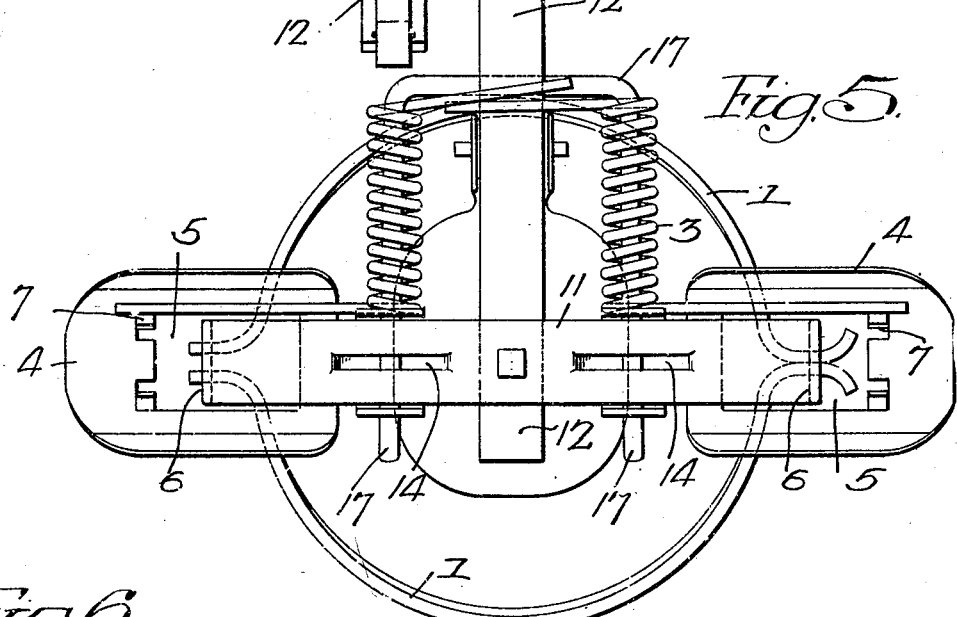
Fig. 5 is an inverted plan view of the trap illustrated in Fig. 4.
Figure 6:
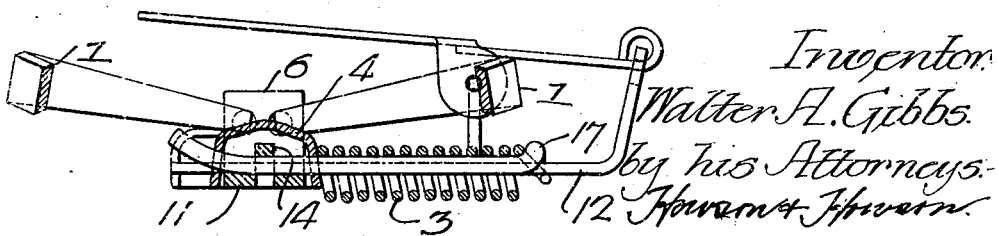
Fig. 6 is a section on the line 6—6, Fig. 4.

Figures 4 to 6, inclusive, while illustrating traps different in detail from those illustrated in the remaining figures, still involve elements corresponding to the previously designated parts of the other traps, and the same reference numerals are used in these views as in the preceding views to denote the corresponding parts. Thus, for example, in Figs. 4, 5 and 6, the ends of the springs 3, 3, which operate the closing levers 4, 4, of which in this instance there are two, are held clear of the sides of the aperture 5 of said levers and of the jaws 1, 1, and the upturned portion 6 of the frame 2 by means of downturned lugs 7, 7 as previously described in connection with Figs. 1, 2 and 3.

A further feature of the invention resides in a novel method of mounting the springs 3, 3, which actuate the closing levers 4, and is illustrated in Figs. 4 to 6, inclusive. It is customary in traps of the type involved, to mount the coiled springs which operate the closing levers on rods suitably secured to the frame and usually constituting the pivot for the closing lever. In the usual construction, however, this spring-holding rod is riveted or otherwise permanently secured in the structure and constitutes a fixed part of the frame. In the present instance, I provide a novel means for securing this rod in the frame which greatly facilitates assembly of the parts of the trap and provides means for facilitating detachment of the spring for replacement.

In Figs. 4, 5 and 6, I have shown the arrangement as applied to traps of the double lever type employing a separate spring for each of the levers 4, 4. The trap in this instance comprises the frame cross arms 11 and 12, the arm 11 of the frame in this instance being provided with two of the aforedescribed loops 14, illustrated in Fig. 6, one loop being placed on each side of the arm 12 of the base. These loops constitute holding means for the ends of a U-shaped rod 17. The cross part of the U-shaped rod 17 passes over the arm 12 of the base, and the extremities of the rod which passes through the loops 14 are turned upwardly, thereby to prevent accidental dislodgment of the ends of the rod from under the loops.

In this instance, two springs 3, 3, are employed, which operate respectively the closing levers 4, 4, one end of each of the springs underlying its respective lever, and the other end underlying the arm 12 of the base.

The springs exert a normal pressure tending to hold the rod 17 down against the top of the arm 12 of the base, and the springs also function in the present instance in conjunction with the turned out ends of the rod 17 to prevent longitudinal movement of the rod 17 through the loops. The respective ends of the rod 17 which occupy the said loops 14 also, as in the present instance, constitute pivot shafts for the closing levers 4, 4.

I claim:

1. In an animal trap, the combination with animal-gripping elements, of a substantially flat apertured operating lever for the latter, a flange at the side edge of the lever, a projection adjacent the edge of the said aperture, and an actuating spring having one end bearing against the side of the lever and confined between said flange and projection.

2. In an animal trap, the combination with animal-gripping elements, of a substantially flat apertured operating lever for the latter, an actuating spring having one end bearing against the side of the lever, and a projection from the side of the lever adjacent the edge of said aperture and adapted to prevent movement of the spring past the edge of said aperture.

3. In an animal trap, the combination with a base, of animal-gripping elements mounted on the base, an actuating spring, and a substantially U-shaped element having its open end detachably mounted on the base and its closed end lying across one of the base members and constituting a support for said spring.

4. In an animal trap, the combination with a base having a pair of spaced loops, of animal-gripping elements mounted on the base, a spring for actuating the elements, a substantially U-shaped rod having its ends established in said loops and constituting a support for the spring, and means preventing accidental withdrawal of the ends of the rod from said loops.

5. In an animal trap, the combination with a base, of animal-gripping elements mounted on the base, an actuating spring for the said elements, a U-shaped mounting for the spring having its ends detachably secured in the base, and means including as an element the said spring for positively preventing accidental detachment of the ends of the said support from the base.

6. In an animal trap, the combination with a base, of animal-gripping elements mounted on the base, a pair of spaced loops in the base, a U-shaped element having its ends extending through the loops, said ends being bent to prevent accidental withdrawal from the loops, and a spring mounted on the U-shaped member and adapted to actuate the said gripping elements.

7. In an animal trap, the combination with a base having divergent members, of animal gripping elements mounted on the base, a pair of spaced loops on one of the members at opposite sides of the other of said members, a U-shaped member having its ends established in said loops and overlying the said divergent base member, and springs mounted on the rods and adapted to actuate the said elements.

8. In an animal trap, the combination with a pair of pivotally mounted coacting jaws, of a pair of closing levers adapted respectively to operate on opposite ends of the jaws to bring the latter together, an independent torsion spring for actuating each of said levers, and means for supporting said springs in positions substantially at right angles to and offset transversely from the axis of said jaws.

9. In an animal trap, the combination with a base, of a pair of pivotally mounted coacting jaws carried by the base, a pair of closing levers adapted to operate upon said jaws, a single spring for actuating each of said closing levers, and a single shaft constituting supports for the springs and journals for the said levers.

10. In an animal trap, the combination with a base, of a pair of coacting jaws pivotally mounted in said base, a pair of closing levers adapted to operate upon the jaws, a single spring for actuating each of the levers, and a single element detachably secured in the base and constituting a support for the springs and journals for the said closing levers.

11. In an animal trap, the combination with a base, of a pair of coacting jaws pivotally mounted in the base, a pair of pivotal closing levers operating upon the jaws, springs for actuating said levers, an element detachably secured to the base and constituting a support for the springs and a journal for the levers, and means including the springs for normally positively preventing accidental detachment of the said support and journal element from the base.

WALTER A. GIBBS.